United States Patent [19]

Monroy

[11] 4,013,352
[45] Mar. 22, 1977

[54] SELF-BLIMPED MOTION PICTURE CAMERA

[76] Inventor: Jacob G. Monroy, 1038 N. Highland Ave., Hollywood, Calif. 90038

[22] Filed: Mar. 25, 1975

[21] Appl. No.: 561,696

[52] U.S. Cl. .................................. 352/35; 352/242
[51] Int. Cl.² ...................................... G03B 31/00
[58] Field of Search ............... 352/34, 35, 242, 243

[56] References Cited

UNITED STATES PATENTS

| | | | |
|---|---|---|---|
| 2,031,608 | 2/1936 | Kiel | 352/35 |
| 3,331,653 | 7/1967 | Blascher | 352/242 X |

FOREIGN PATENTS OR APPLICATIONS

| | | | |
|---|---|---|---|
| 1,150,504 | 4/1969 | United Kingdom | 352/35 |

Primary Examiner—Monroe H. Hayes
Attorney, Agent, or Firm—Howard A. Silber

[57] ABSTRACT

A compact self-blimped motion picture camera is achieved by mounting all drive train components on a mounting frame which together with a truncated conical lens support floats within the camera body. The lens support includes a forward annular lens mount and a generally cylindrical section the rear end of which is affixed to the mounting frame. The lens support is truncated in a 45° plane that intersects the cylinder periphery just rearward of the lens mount and intersects the lens support rear end plane in a line that crosses the cylindrical axis. A rotating shutter and mirror assembly includes a sector-shaped mirror that rotates in a plane immediately behind the lens support truncation plane. Noise is minimized by using only belt and pulley drive components and only sleeve bearings.

9 Claims, 5 Drawing Figures

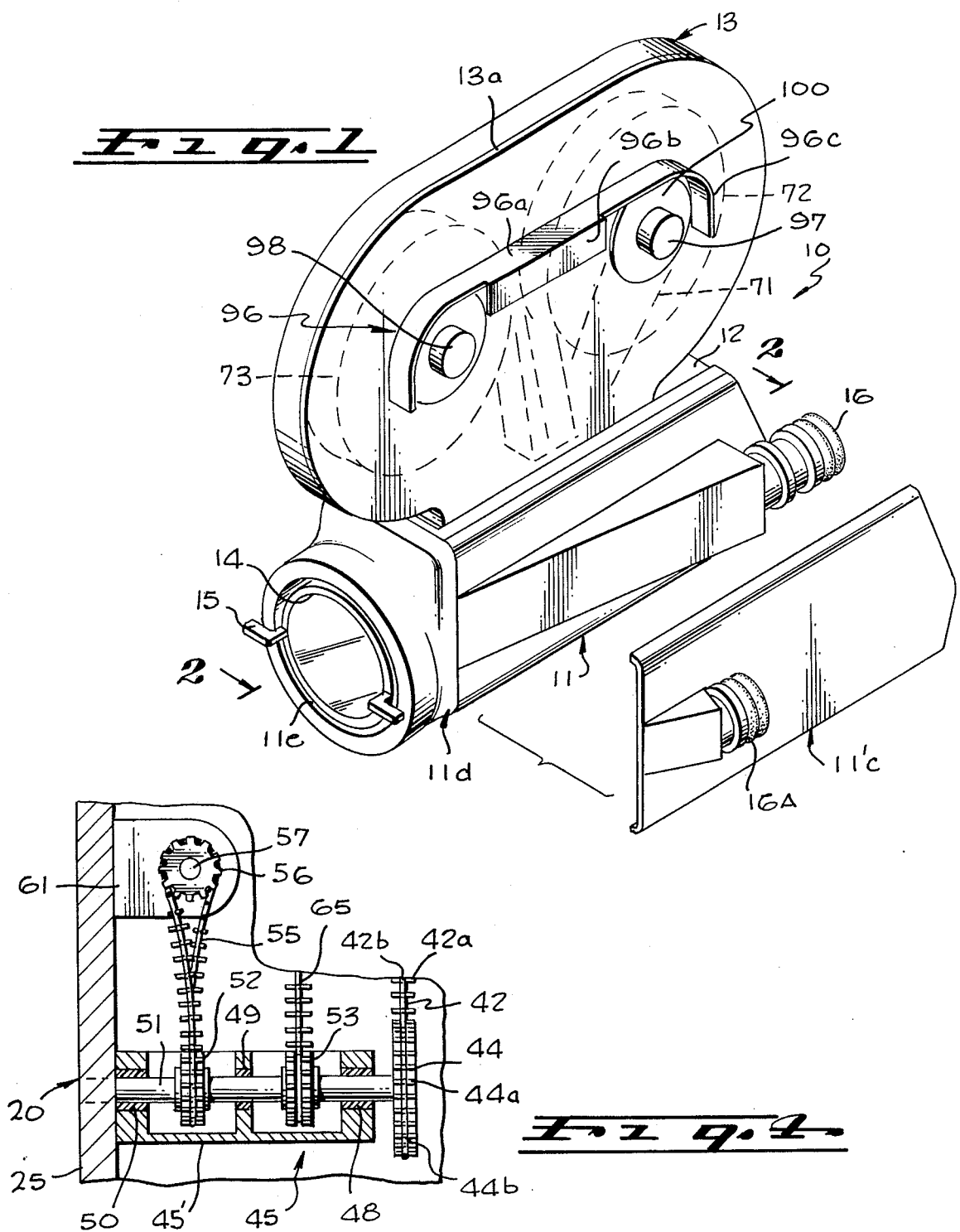

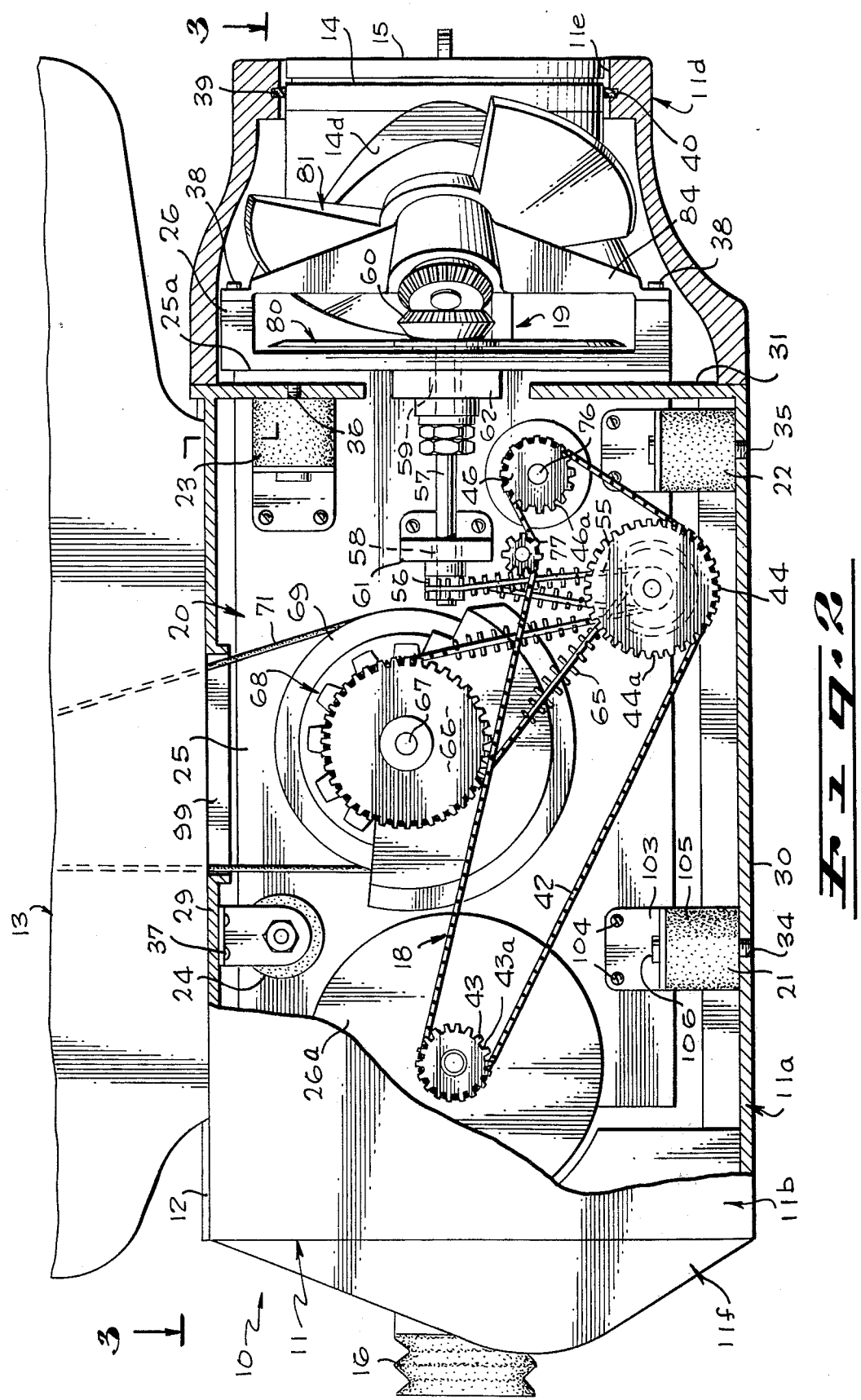

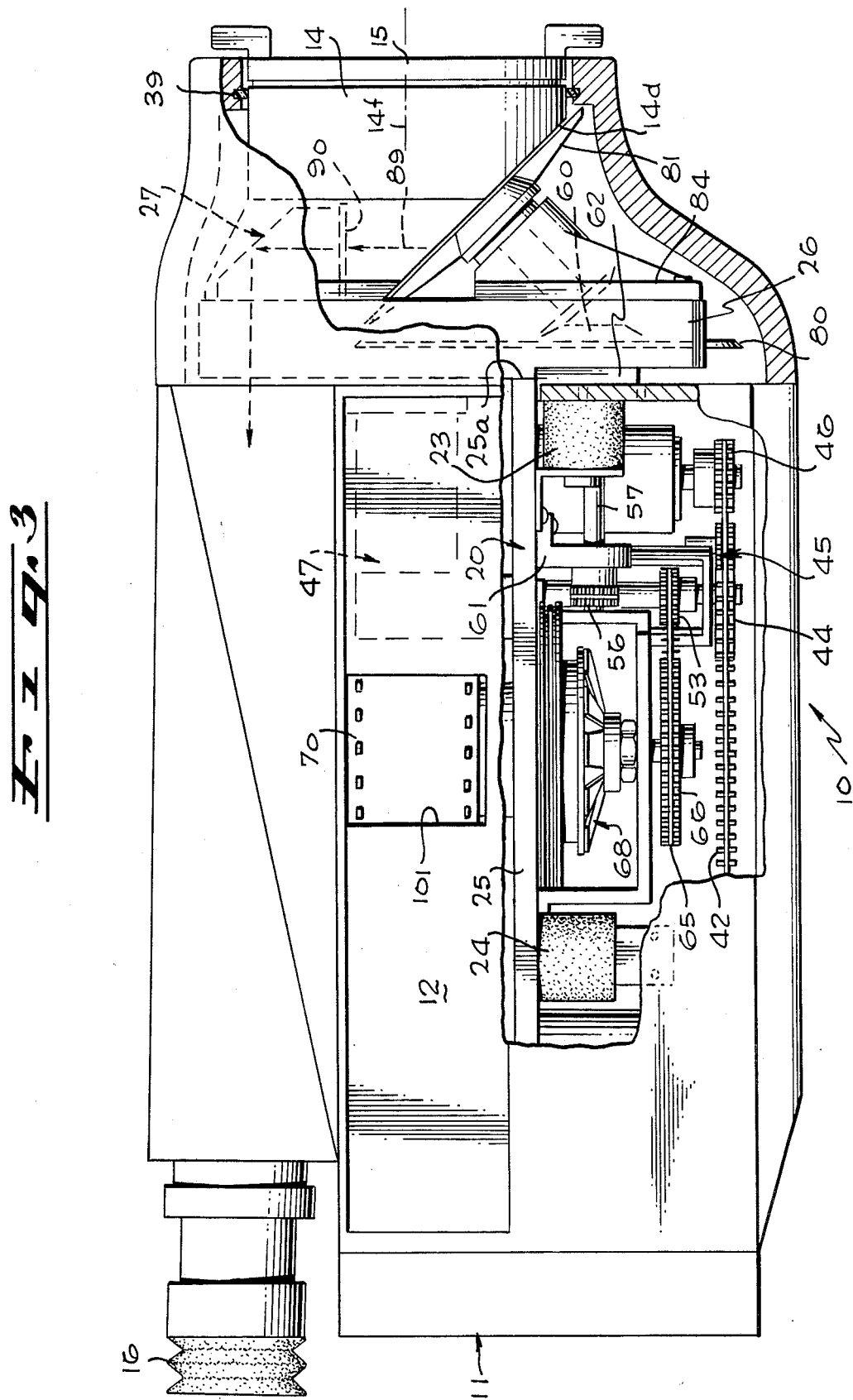

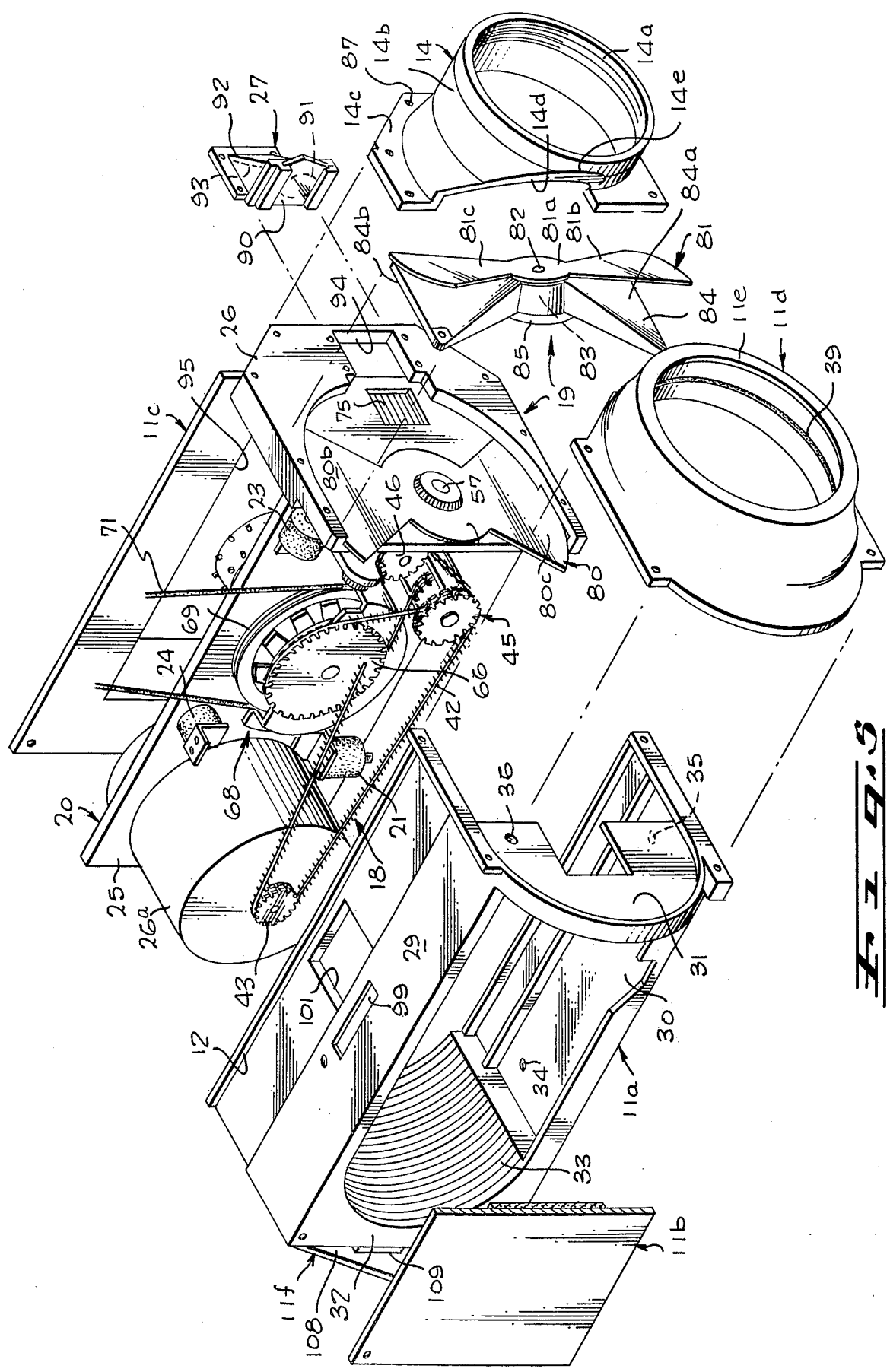

SELF-BLIMPED MOTION PICTURE CAMERA

BACKGROUND OF THE INVENTION

1. Field of the Invention

The present invention relates to a motion picture camera, and particularly to a compact, lightweight self-blimped camera that is sufficiently quiet for sound movie production.

2. Description of the Prior Art

For commercial sound motion picture photography, the camera must be extremely quiet so that it will not emanate noises which can be picked up and recorded by the movie sound system. In the past, noise elimination generally has required the use of "blimped" cameras wherein the camera is mounted in a large soundproof housing called a "blimp". The camera itself may be quite small and relatively light, typically about 25 pounds, but the blimp is very bulky and might weight as much as 100 pounds. Use of a blimped arrangement thus substantially limits camera mobility.

There are many noise sources in the typical prior art movie camera. Paramont among these is gear noise generated by the multiple metal gears used in the film mechanism. One object of the present invention is to provide a camera using no gears in the drive train. Another noise source is the bearings. Even ball bearings produce noise, and it is a further object of the present invention to provide a camera using only sleeve bearings which produce minimal noise.

The camera case itself may act as a noise radiator. Thus where the rigid metal case is used as the support member for the gear drive train, the acoustic radiation efficiency is increased, resulting in a higher noise level. A further object of the present invention is to provide a camera in which the entire camera mechanism is mounted on a frame that resiliently floats within the outer case, so that noise radiation via the case is minimized.

A problem with achieving this in the past concerns the lens mount. There must be a rigid relationship between the lens support and the film transport mechanism. If the lens mount were affixed to the camera case, the film transport components themselves must be rigidly mounted to the case. But this would defeat the use of a floating film assembly. Thus another object of the present invention is to provide a camera having a unique lens mount that itself is resiliently isolated from the camera housing.

Another problem associated with prior art lens mounts is that of size and complexity. Most movie camers use a rotating shutter that "opens" each time that a film frame is positioned and is temporarily stationary in the transport movement. Advantageously the camera also has an optical path that permits viewing of the scene through the lens during times that the shutter is "closed". This may necessitate use of a rotating mirror that is positioned in the lens light path in alternation with the shutter. Complex mechanical arrangements are necessary to accommodate the rotating mirror and shutter components, often complicating the lens mount design. An object of the present invention is to provide a simplified lens mount that readily accommodates the through-the-lens viewing components.

An overall object of the present invention is to provide a compact motion picture camera that is sufficiently quiet so as to be useful for studio sound movie production without the use of a "blimp". The camera thus provides excellent mobility, giving the cameraman more freedom than previously possible. The camera also can be used for portable assignments, as it need not be tripod mounted, but can readily be hand carried or shoulder mounted while in use.

SUMMARY OF THE INVENTION

These and other objects are achieved by providing a self-blimped camera in which the drive mechanism is mounted on a frame that is resiliently attached so as to "float" within the camera housing. A unique lens mount itself is rigidly affixed to the frame but resiliently isolated from the housing.

The drive mechanism itself employs only three belts which interconnect the motor to the various film drive and shutter components. No gears are used in the drive train, and only sleeve bearings are employed. Twists in the belts facilitate direction reversal as required.

The lens mount consists of a generally cylindrical member rigidly attached at its rearward end to the floating frame. A resilient seal isolates the forward end from the encircling front end of the camera housing. This forward end is configured for lens attachment. The cylindrical member is truncated in a plane that intersects the outer periphery just rearward of the lens attachment forward end of the member. The truncation plane is disposed at a 45° angle to the cylindrical axis, and intersects the rear end plane of the cylindrical member along a line that includes the cylindrical axis, with configuration permits a rotating mirror to be mounted in a 45° plane directly behind the lens mount truncation plane. The mirror alternately permits passage of light from the lens to the film or to a viewer. The truncated lens mount and adjacent rotating mirror arrangement is considerably more compact than in prior art cameras.

BRIEF DESCRIPTION OF THE DRAWINGS

A detailed description of the invention will be made with reference to the accompanying drawings wherein like numerals designate corresponding elements in the several figures.

FIG. 1 is a pictorial view of the invention camera.

FIG. 2 is a transverse sectional view of the camera as viewed along the line 2—2 of FIG. 1, and showing the belt drive and the rotating mirror components all attached to a mounting frame that is resiliently mounted within the camera housing.

FIG. 3 is another sectional view of the camera, looking downward along the line 3—3 of FIG. 2.

FIG. 4 is a detail plan view, partly in section, of the idler assembly used in the belt drive mechanism.

FIG. 5 is an exploded perspective view showing the principal camera components including the truncated cylindrical lens support.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

The inventive unblimped movie camera 10 is contained in a housing 11 having an upper guideway 12 (FIG. 5) that receives a film magazine 13. The camera includes a lens support 14 threaded to the front of which is a conventional bayonet lock lens mount 15 which receives the lens itself (not shown). The housing 11 includes a viewer 16 through which the cameraman can see the scene being photographed.

The film drive mechanism 18 (FIGS. 2 and 5), a rotating shutter assembly 19 and the lens support 14 all are attached to a mounting frame 20 that is resiliently attached to the housing 11 by means of shock mounts 21 – 24. The mounting frame 20 itself includes a plate 25 to which a motor 26a and the drive train 18 components are attached. Rigidly, perpendicularly attached to the front end 25a of the plate 25 is a shutter frame member 26. This member 26 in turn supports the shutter assembly 19, a ground glass screen assembly 27 and the lens support 14. The common support frame 20 thus provides the necessary rigid relationship between the lens support 14, the shutter assembly 19 and the film drive mechanism 18.

The camera housing 11 itself has four principal components. The main housing section 11a is a unitary structure including generally parallel top and bottom walls 29, 30 that are connected by a semicircular forward panel 31 and a rear wall 32 the interior of which is fluted to form a heat sink 33. One open side of the main housing section 11a is closed by a cover panel 11b. The other side is closed by a panel 11c which includes the viewer 16. Affixed to the forward panel 31 is a housing front end section 11d which has an open forward end 11e and a cylindrical interior that surrounds the lens support 14.

The mounting frame 20 is resiliently attached to the housing section 11a. Specifically, the shock mounts 21 and 22 are screwed into threaded holes 34, 35 in the housing bottom 30, the shock mount 23 is attached to a threaded hole 36 in the forward panel 31, and the shock mount 24 is attached by screws 37 to the housing top 29. The shutter frame member 26 is rigidly connected to the plate 25, but itself is not connected to the housing forward panel 31. The lens support 14 is rigidly attached to the frame member 26 by means of screws 38, but is not attached to the housing front end 11d. An annular resilient seal 39 (FIGS. 2 and 3) isolates the bayonet lock lens mount 15 from the housing front end 11d. This seal 39 may comprise an O-ring mounted within an annular groove 40 along the inner periphery of the forward opening 11e. With this arrangement, the shock mounts 21 – 24 and the resilient seal 39 together permit the mounting frame 20 and lens support 14 to "float" within the housing 11.

The film drive mechanism 18 advantageously utilizes polyurethane coated steel belts for all drive functions. Such a belt 42 is used to interconnect a driver pulley 43 on the motor 26a to a pulley 44 on an idler assembly 45 and to a drive pulley 46 associated with a film transport movement 47. Preferably the belt 42 has transverse tabs 42a (FIG. 4) that cooperate with teeth 43a, 44a, 46a on the respective pulleys 43, 44, 46. The tabs 42a are maintained parallel to the pulley axes by means of a bead or boss 42b on the belt 42 that fit into a peripheral recess 44b (FIG. 4) in the pulley 44 and similar recesses in the other pulleys 43 and 46. Such belts are available commerically, as from the Benrus Division, of the PIC Corporation, Richfield, Connecticut, type "FS series superbelt".

The idler assembly 45 (FIG. 4) includes a housing 45' that is rigidly mounted to the plate 25. It includes three idler sleeve bearings 48, 49, 50 that preferably consist of a self lubricating material such as "Oil-lite" (a trademark of the Amplex Division of Chrysler Corporation), Teflon or nylon. A common shaft 51, preferably hardened and ground steel, extends through the sleeve bearings 48 – 50 and is affixed for rotation with the idler pulley 44. Also mounted to the shaft 51 for rotation therewith are two pulleys 52 and 53. The use of self lubricating sleeve bearings minimizes noise generation.

A belt 55 driven by the idler assembly pulley 52 itself is used to drive the rotating shutter assembly 19. To this end, the belt 55 engages a shutter drive pulley 56 affixed to a shaft 57 having an axis that is parallel to the plane of the plate 25. The shaft 57, preferably steel, is journaled within a pair of self lubricating sleeve bearings 58, 59, and is connected to a shutter drive gear 60. The bearing 58 is situated within an L-shaped support bracket 61 that is screwed to the plate 25. The bearing 59 is situated within a bearing support 62 that is attached to the rear of the shutter frame member 26. Since the axis of the shaft 57 is perpendicular to that of the shaft 51, the belt 55 will twist through a 90° angle. This arrangement eliminates the need for the 45° bevel gears typically used in prior art cameras to drive the shutter mechanism.

Associated with the other idler pulley 53 is a belt 65 that leads to a clutch drive pulley 66. This pulley is affixed to a shaft 67 connected to the input of a conventional slip clutch mechanism 68 the output of which drives a pulley 69, and to a film sprocket wheel 70. The pulley 69 cooperates with a belt 71 to drive the film take-up reel 72 (FIG. 1) in the film magazine 13. The sprocket wheel 70 operates in a known manner to deliver film from a feed reel 73 to the film transport mechanism 47 (FIG. 3) and to return the film to the take-up reel 72. The slip clutch 68 compensates for differences in the requisite rotational rate of the take-up reel 72 as more film is spooled onto that reel.

The rotational direction of the film sprocket reel 70 and hence of the pulley 66 is opposite to that of the idler pulley 53. To accomplish this direction reversal, the belt 65 loops through a 180° bend. This arrangement eliminates the need for the reversing gears employed in prior art cameras.

The film transport movement 47 is a conventional assembly which moves the film frame by frame into place in front of a window 75 (FIG. 5) in the shutter frame member 26. The movement 47 is driven by a shaft 76 connected to the pulley 46 (FIG. 2). An idler wheel 77 directs the main drive belt 42 around a substantial angular portion of the pulley 46 to insure slip-free drive of the film transport movement 47.

The rotating shutter assembly 19 (FIGS. 2, 3 and 5) includes a shutter 80 in the shape of a disk from which two sectors have been removed. Thus the shutter 80 consists of a central circular section 80a connected to be driven by the shaft 57 and having two diametrically opposed sectors 80b, 80c which serve to block the entry of light as they rotate past the window 75. With this arrangement, as the shaft 57 and the attached shutter 80 rotate, light passing through the lens alternately will be permitted to pass through, or blocked from passage through the window 75. In a known manner, the shutter 80 is positioned so as to be synchronized with the film transport movenent 47. Thus, when the window 75 is exposed (as shown in FIG. 5), a film frame will be held stationary behind the window 75 to expose the film. When the window 75 is blocked by a shutter section 80b or 80c, the film transport movement 47 will be advancing the film to the next frame. Two frames are exposed for each single rotation of the shutter 80.

To facilitate through-the-lens viewing of the scene being photographed, the shutter assembly 19 includes a rotating mirror 81 of "butterfly" configuration similar to that of the shutter 80. Thus the mirror 81 includes a central circular section 81a and two integral, diametrically opposed sectors 81b, 81c each having a front-surface mirror. The function of these mirrors 81b, 81c is to reflect light coming from the lens to the viewer 16 during those times that the window 75 is blocked by the shutter sectors 80b and 80c.

To this end, the mirror 81 is affixed at its center to a shaft 82 which is journaled through a self-lubricating sleeve bearing 83 in a mirror support bracket 84. The shaft 82 terminates at a Teflon bevel ear 85 that meshes with the gear 60, also preferably Teflon.

The support bracket 84 includes two legs 84a, 84b which are attached at their extremities to the shutter frame member 26 radially outwardly of the shutter 80. The bearing 83 portion of the bracket 84 maintains the shaft 82 at a 45° angle with respect to the shaft 57. The gears 60 and 85 are beveled at 22 ½° each. This arrangement insures that the mirror 81 is disposed within, and rotates in a plane that is at a 45° angle with respect to the direction of entrant light, i.e., with respect to the axis of the lens support 14.

A lens support 14 of unique configuration is used to minimize camera size while facilitating use of the rotating mirror assembly just described. Thus the lens support 14 is of generally cylindrical shape, and has a forward annular ring 14a that is interiorly threaded to receive the bayonet lock lens mount 15. Rearward of the annular ring 14a is a generally cylindrical section 14b which may have a gradually increasing diameter. At the rear end of this cylindrical section 14b is a radially outwardly projecting flange 14c that is attached to the shutter frame member 26 by means of screws 87.

The lens support 14 is truncated to receive the rotating mirror 81. Specifically, the cylindrical section 14b is cut off to form an edge 14d that lies in the plane of truncation. This plane intersects the outer periphery of the lens support 14 at a point 14e just rearward of the annular ring 14a. The truncation plane intersects the rear end of the lens support 14, and hence intersects the flange 14c, along a line that passes through the axis 14f (FIG. 3) of the lens support 14. The truncation plane itself is disposed at an angle of 45° with respect to that axis 14f.

The plane of the rotating mirror 81 is situated immediately behind the lens support truncation plane, as evident in FIG. 3. The radius of each mirror sector 81b, 81c is sufficiently great so that when either sector is interposed in the light path, the light will be reflected along a path indicated by the arrows 89 in FIG. 3. This path goes through a ground glass screen 90 and an illuminating lens 91 supported by a bracket 92 that is part of the assembly 27. The bracket 92 also holds a front-surfaced mirror 93 angled at 45° so as to reflect light rearwardly through an opening 94 in the shutter frame member 26 and through a channel 95 in the side panel 11c to the viewer eyepiece 16.

The rotating mirror segments 81b, 81c are aligned with the shutter segments 80b, 80c so that viewing occurs during those times when the window 75 is blocked by the shutter 80. The close proximity of the rotating mirror 81 behind the truncation plane of the lens support 14 minimized camera size.

Use of the floating mounting frame, sleeve bearings and a belt film drive mechanism as described, results in an extremely quiet camera. The noise level is sufficiently low so that the camera 10 can be used in sound studios without a blimp. The small size, in part facilitated by the unique truncated cylindrical lens support, provides considerable mobility, even when tripod mounted. The small size and light weight also permits the camera 10 to be hand-held or shoulder mounted for portable use. To this end, an optional short length viewer 16A may be substituted for the viewer 16 of FIG. 1. This is accomplished by replacing the side panel 11c with the optional alternate panel 11c'.

For ease of carrying the camera 10, the film magazine 13 is provided with a handle 96 of the configuration shown in FIG. 1. This handle 96 is formed as a unitary part of the magazine cover 13a and includes a planar portion 96a extending laterally from the cover 13a and terminating at a depending flange 96b. By gripping the fingers around the flange 96b, the entire camera 10 can be held in one hand. The ends 96c of the lateral member 96a curve downward to cover the drive knobs 97, 98 on the respective take-up and feed reels 72 and 73.

The take-up reel drive belt 71 extends through an opening 99 (FIG. 5) into the magazine 13 and is attached to a pulley 100 associated with the take-up reel shaft. The film from the feed reel 73 enters the camera 10 via an opening 101 in the top wall 29. It is driven by the film sprocket wheel 70 which is disposed below the window 101 within the camera housing 11.

The shock mount 21 (FIG. 2) comprises an L-shaped bracket 103 that is attached to the plate 25 by means of screws 104. A large cylindrical spacer 105 or rubber or other resilient material extends between the bracket 103 and the bottom wall 30. A bolt 106 extends through a whole in the bracket 103 and through a central opening through the resilient spacer 105 into the threaded hole 34. The shock mounts 22 – 24 are of similar configuration.

The camera housing 11 may be provided with a rear panel 11f (FIG. 5) that is spaced from the rear wall 32. This provides a chamber 108 in which electronics 109 may be mounted. For example, the electronics 109 may comprise a servo system for controlling the speed of the motor 26a. The interior fluted wall region 33 serves as a heat sink for the electronics 109.

Intending to claim all novel, useful and unobvious features shown or described, the applicant claims:

1. An unblimped motion picture camera comprising:
   a housing,
   a mounting frame floatingly, resiliently shock mounted within said housing, said frame including a plate to which all drive train components are mounted, and a forward panel affixed to said plate perpendicularly thereof, said drive train components consisting of:
   a motor,
   an idler assembly, including a shaft having an axis parallel to that of said motor and perpendicular to said frame, said shaft being journal mounted within sleeve bearings, there being a driven pulley and two driver pulleys affixed to said shaft,
   a drive pulley for a film transport movement, a first belt connecting said motor, said idler assembly driven pulley and said transport movement drive pulley, a film-take-up reel drive clutch mechanism mounted on said plate and including a clutch drive pulley, a second belt connecting one of said idler driven pulleys to said clutch drive pulley, said belt being arranged so that the rotational direction of said clutch mechanism is opposite to said motor, a rotating shutter mechanism mounted to said frame forward panel, said shutter mechanism having a drive shaft extending rearwardly of said forward panel and attached to a pulley, and a third belt extending from the other idler driven pulley and being arranged to engage said shutter mechanism pulley, said motor, said idler assembly, said clutch mechanism, said film transport movement drive pulley and said shutter mechanism drive shafts all having sleeve bearings.

2. An unblimped motion picture camera according to claim 1 wherein said housing includes a body and a forward, generally cylindrical front end section attached to said body and having an open forward end, and further comprising:

a truncated cylindrical lens support consisting of a forward annular lens mount, an intermediate generally cylindrical section and a rear flange portion that is rigidly attached to the forward panel of said mounting frame, said intermediate section being truncated in a plane angled at about 45° to the axis of said lens support, the plane of truncation intersecting the outer periphery of said lens support just rearward of said annular lens mount, the line defined by the intersection of said truncation plane and the rear end plane of said lens support being in close proximity to the intersection of the axis of said lens support and that rear end plane, the forward annular lens mount being resiliently, concentrically supported within the cylindrical forward end of said housing so that said frame and said lens mount together "float" within said housing, and wherein said rotating shutter mechanism includes a sector-shaped mirror mounted to rotate in a plane parallel to and immediately rearward of said truncation plane, sectors of said mirror rotating into the lens light path alternately to reflect light to a viewer and to permit passage of light to film in said camera.

3. An unblimped motion picture camera according to claim 2 wherein said shutter mechanism includes;

a sector-shaped shutter mounted for rotation parallel to the plane of said forward panel, said shutter being affixed to said shutter mechanism drive shaft, a mirror support bracket attached to said forward panel and having a sleeve bearing disposed at about a 45° angle to the plane of said shutter, said sector-shaped mirror being attached to a mirror shaft journaled through said support breacket sleeve bearing, said mirror shaft being connected to said shutter mechanism drive shaft by meshed bevel gears of Teflon or like material.

4. An unblimped motion picture camera according to claim 2 wherein a portion of said housing body is configured as a heat sink for motor drive control electronics mounted to said body.

5. An unblimped motion picture camera according to claim 2 including a film magazine removably attached to said housing body, said magazine having a handle integral therewith, said handle including a generally planar section extending laterally from a wall of said magazine and a depending flange at the outer edge of said planar section.

6. An unblimped motion picture camera comprising:

a housing including a body and a forward, generally cylindrical front end section attached to said body and having a forward end that is open to permit a lens to project therethrough, a mounting frame floatingly, resiliently shock mounted within said housing, all of the camera drive train components being mounted to said mounting frame, said mounting frame including a rigid plate and a generally planar shutter panel rigidly, perpendicularly attached to the front end of said plate, a truncated cylindrical lens support rigidly attached to said shutter panel, said lens support consisting of a forward annular lens mount, an intermediate generally cylindrical section and a rear flange which abuts against and is rigidly fastened to said shutter panel, said intermediate section being truncated in a plane disposed at substantially a 45° angle to the axis of said lens support, the plane of truncation intersecting the outer periphery of said cylindrical lens support just rearward of said forward annular lens mount, the line defined by the intersection of said truncation plane and the plane of said rear flange being in close proximity to the intersection of the axis of said lens support and said rear flange plane, the forward annular lens mount being resiliently, concentrically, floatingly supported within the cylindrical forward end of said housing, and a rotating shutter/mirror assembly including a sector-shaped rotating mirror mounted to rotate in a plane parallel to and immediately rearward of said truncation plane, sectors of said mirror rotating into the lens light path alternately to reflect light to a viewer and to permit passage of light to film in said camera, said shutter/mirror assembly being mounted to said shutter panel.

7. An unblimped motion picture camera according to claim 6 wherein said drive train components consist of:

a motor, an idler assembly, including a shaft having an axis parallel to that of said motor and perpendicular to said frame, said shaft being journal mounted within sleeve bearings, there being a driven pulley and two driver pulleys affixed to said shaft, a drive pulley for a film transport movement, a first belt connecting said motor, said idler assembly driven pulley and said transport movement drive pulley, a film take-up reel drive clutch mechanism mounted on said plate and including a clutch drive pulley, a second belt connecting one of said idler driven pulleys to said clutch drive pulley, said belt being arranged so that the rotational direction of said clutch mechanism is opposite to said motor, a drive shaft for said rotating shutter/mirror assembly, said drive shaft extending rearwardly of said shutter panel and being attached to a pulley, and a third belt extending from the other idler driven pulley and being arranged to engage said shutter assembly pulley, said motor, said idler assembly, said clutch mechanism, said film transport movement drive pulley and said shutter mechanism drive shafts all having sleeve bearings.

8. An unblimped motion picture camera according to claim 7 wherein each of said belts includes lateral tabs that engage teeth on said pulleys.

9. An unblimped motion picture camera according to claim 6 together with an annular resilient seal between the outer periphery of said forward annular lens mount and the inner periphery of said housing forward end.

* * * * *